UNITED STATES PATENT OFFICE.

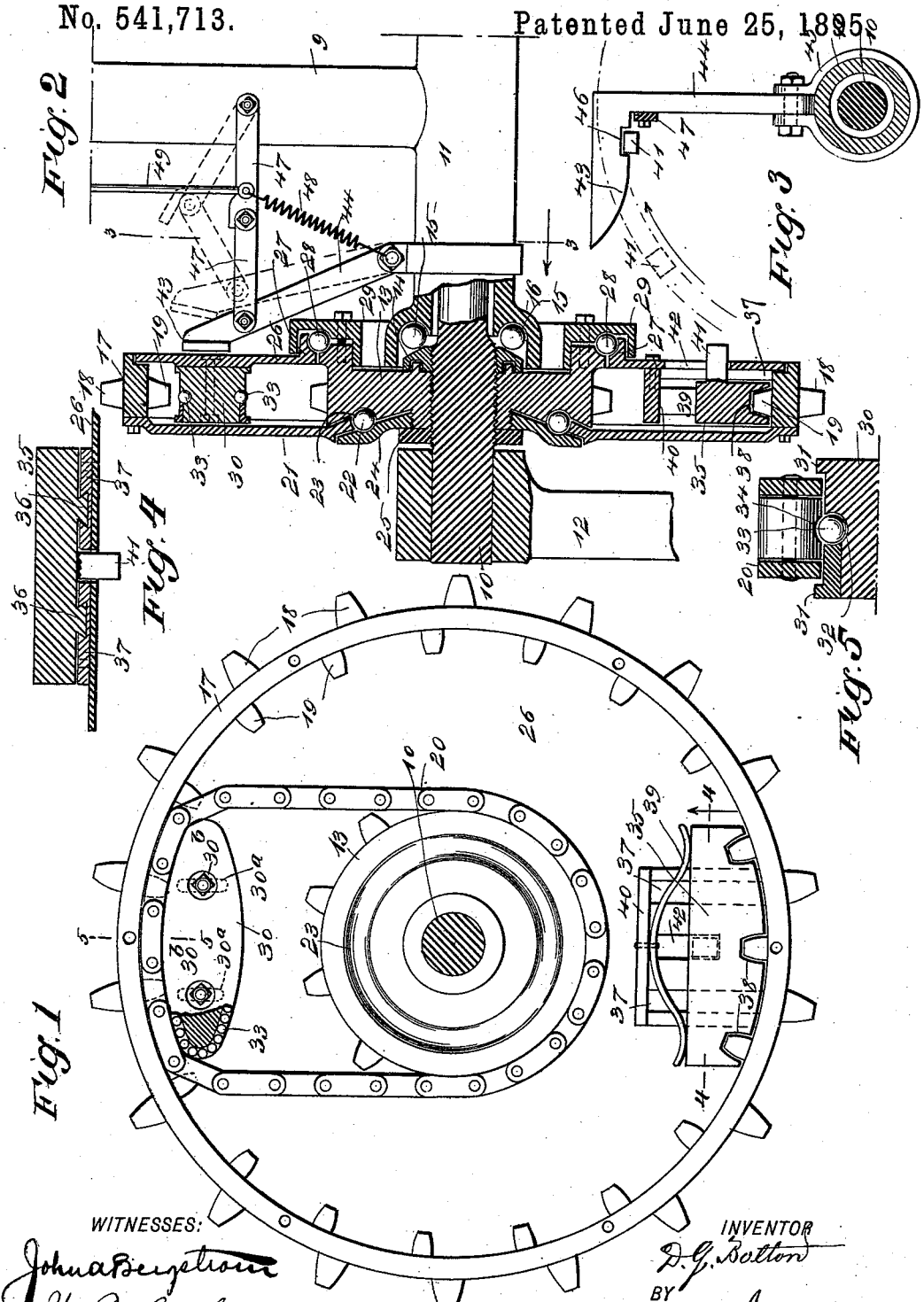
(No Model.)
D. G. BOLTON.
CHANGEABLE DRIVING GEAR.
No. 541,713. Patented June 25, 1895.
WITNESSES:
Joshua Bergstrom
H. B. Hutchinson
INVENTOR
D. G. Bolton
BY
Munn & Co.
ATTORNEYS.

DAN GREGORY BOLTON, OF COOPERSTOWN, NEW YORK.

CHANGEABLE DRIVING-GEAR.

SPECIFICATION forming part of Letters Patent No. 541,713, dated June 25, 1895.

Application filed June 28, 1894. Serial No. 515,946. (No model.)

*To all whom it may concern:*

Be it known that I, DAN GREGORY BOLTON, of Cooperstown, in the county of Otsego and State of New York, have invented a new and Improved Changeable Driving-Gear, of which the following is a full, clear, and exact description.

My invention relates to improvements in a changeable driving gear which is particularly adapted for use on bicycles and more especially safety bicycles; and the object of my invention is to produce a practical and comparatively simple gear which may be applied to bicycles of any make and employing a sprocket wheel driving gear, and which may be conveniently operated while the bicycle is in motion, and changed from a high to a low gear or vice versa, so as to adapt the machine to the variations of the road, wind, &c., and enable the rider to propel the machine with the greatest possible ease and, when conditions favor, with the utmost speed.

To these ends my invention consists of certain features of construction and combinations of parts, which will be hereinafter described and claimed.

Reference is to be had to the accompanying drawings forming a part of this specification, in which similar figures of reference indicate corresponding parts in all the views.

Figure 1 is a broken sectional elevation of my improved driving-gear. Fig. 2 is a detail cross-section of the gear as applied to the crank-shaft of a bicycle. Fig. 3 is a detail cross-section on the line 3 3 of Fig. 2, showing the locking-latch which engages the locking-block so as to change the speed of the gear. Fig. 4 is a detail cross-section on the line 4 4 of Fig. 1, and illustrates how the locking-block is held to slide on the back plate of the main sprocket-wheel; and Fig. 5 is a detail cross-section on the line 5 5 of Fig. 1.

The crank shaft 10 is of the ordinary kind and is journaled in the usual way in the sleeve bearing 11 of the bicycle frame 9, which frame may be of any approved kind, and the shaft is provided with the usual cranks 12 adapted to carry the pedals. The crank shaft has rigidly secured to it a small sprocket wheel 13, having on its inner side the usual cone nut 14, against which bear the balls 15 which are held in the socket 16 on the end of the bearing sleeve 11. The sprocket wheel 13 is encircled by a relatively large sprocket wheel 17 which has teeth 18 on its outer side to engage the ordinary drive chain and which also has teeth 19 on its inner side, that is, on the inner side of its rim, to engage the chain 20 which is driven by the small sprocket wheel 13 and which connects with the teeth 19 in the manner described hereinafter.

The front side of the sprocket wheel 17 is closed by a plate 21 which, at its inner edge, rests on the bearing balls 22, these being held in the groove 23 in the side of the sprocket wheel 13 and being bound in place by the nut plate 24 which is screwed to the hub of the sprocket wheel and is held in place by a nut 25 on the crank shaft, as shown clearly in Fig. 2. The sprocket wheel 17 is provided with a back plate 26, which is loose on the said sprocket wheel and which has an inner bearing flange 27 resting on the bearing balls 28 on the opposite side of the wheel 13 from the bearing balls 22, and the balls are held in place by a cap and dust guard 29 which is bolted to the sprocket wheel 13 and covers the balls 28 and also overlaps the flange 27 and the corresponding flange on the sprocket wheel 13.

The chain 20, which connects with the sprocket wheel 13 and with the teeth 19 of the sprocket wheel 17, passes over an elliptical bearing block 30 which is curved to correspond with the curvature of the sprocket wheel 17, and to enable the block to be adjusted radially to compensate for any lost motion in the chain 20 it is secured to the back plate 26 by means of bolts 30$^b$ which extend through slots 30$^a$ in the back plate, as shown in Fig. 1. The bearing block 30 has, on its outer edge, parallel flanges 31 to guide the chain 20, and to enable the chain to run smoothly and without friction the block 30 is longitudinally grooved, as shown at 32, and bearing balls 33 are held in the groove and are adapted to enter grooves 34 in the inner sides of the chain links, as shown clearly in Fig. 5.

The locking of the wheels is effected by means of a locking block 35, which has ribs 36 dovetailed into a plate 37 which is secured to the back 26 of the wheel 17, and the locking block is thus adapted to slide radially, as clearly shown in Fig. 1. The locking block is provided with notches 38 to engage the teeth 19 of the sprocket wheel 17, and it is pressed normally into engagement with the said teeth by a curved spring 39 which lies on the inner edge of the block and is held against the flange 40 of the plate 37. The locking block 35 has, in its back side, a stud 41 which projects outward through a radial slot 42 in the back plate 26, and this stud is adapted to engage the inclined bit 43 of the latch 44, which latch is pivoted on the sleeve 11, but may be pivoted on any adjacent portion of the frame 9, and the bit of the latch has a notch 46 which is adapted to engage the stud 41 and hold the locking block 35 out of engagement with the teeth 19.

The latch 44 is connected, by means of toggle levers 47, with the frame 9, and these levers are normally pulled down by a spring 48 which is secured to one of the toggle levers and to the frame below, and when the toggle levers are straightened out, as in Fig. 2, the bit 43 is held in the path of the stud 41 so that, as the sprocket wheel turns, the stud will strike the incline of the bit and follow along until it reaches the notch 46, and this movement gradually draws in the locking block so as to release it from the teeth 19.

The toggle levers 47 may be pulled up to the position shown by dotted lines in Fig. 2, so as to draw in the latch 44 by means of the rod 49 which extends upward to the top of the bicycle frame and may be worked by any ordinary lever mechanism, which is not shown, as many devices may be used for this purpose. When the latch 44 is held in out of the path of the stud 41 and the crank shaft 10 is turned, the locking block 35 is in engagement with the teeth 19 and the wheel 17 is, by means of this block and the chain 20, rigidly connected with the wheel 13, so that both wheels turn as if they were a single wheel and a high speed is imparted to the machine. If, however, it is desired to run the machine at a slower speed, but with greater power, the rod 49 is moved so as to permit the spring 48 to straighten the toggle levers and throw the latch bit 43 into the path of the stud 41 and, as the wheel revolves, the stud engages the bit as specified, thus drawing the locking block out of engagement with the teeth 19 and then the wheel 17 is rotated by the chain 20, the wheel turning on the bearing balls 22 and 28 and thus moving with reduced speed but with much greater power.

Having thus described my invention, I claim as new and desire to secure by Letters Patent—

1. The combination, with the small sprocket wheel, the large sprocket wheel journaled on the smaller one and the driving connection between the two wheels, of the teeth on the inner side of the large wheel, the loose back plate on the larger wheel, the locking block held to move radially on the back plate and engage the teeth of the large wheel, the stud secured to the locking block and extending through a slot in the back plate, and a latch on an adjacent support adapted to engage the stud of the locking block, substantially as described.

2. The combination, with the bicycle frame, the crank shaft journaled thereon, the small sprocket wheel on the crank shaft, the large sprocket wheel journaled on the small sprocket wheel and provided with an inner row of teeth, and the loose back plate on the large sprocket wheel, of the locking block held to slide radially on the back plate and engage the teeth of the large sprocket wheel, the stud on the locking block, the latch hung on the frame and provided with an inclined bit to engage the stud of the locking block, the toggle joint connection between the latch and an adjacent portion of the frame, and means, as the spring and rod, to move the toggle joint in opposite directions, substantially as described.

DAN GREGORY BOLTON.

Witnesses:
   ARTHUR J. FELFER,
   RUSSEL WARREN.